United States Patent
Spence et al.

(10) Patent No.: US 6,991,281 B2
(45) Date of Patent: Jan. 31, 2006

(54) ADJUSTABLE ROOF EXTENSION FOR REDUCING VEHICLE WIND RESISTANCE

(75) Inventors: W. Jason Spence, Greensboro, NC (US); Michael C. Sorrells, Greensboro, NC (US); Lennart Höglin, deceased, late of Kramfors (SE); by Anna-Lisa Höglin, legal representative, Kramfors (SE)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/788,027

(22) Filed: Feb. 26, 2004

(65) Prior Publication Data

US 2005/0189786 A1 Sep. 1, 2005

(51) Int. Cl.
*B62D 35/00* (2006.01)

(52) U.S. Cl. .................. 296/180.2; 296/180.5
(58) Field of Classification Search .. 296/180.1–180.3, 296/180.5, 91, 217; 180/903
See application file for complete search history.

(56) References Cited

U.S. PATENT DOCUMENTS

| 2,863,695 | A |   | 12/1958 | Stamm |            |
|-----------|---|---|---------|-------|------------|
| 4,006,931 | A |   | 2/1977  | Groves |           |
| 4,102,548 | A |   | 7/1978  | Kangas |           |
| 4,156,543 | A |   | 5/1979  | Taylor et al. |    |
| 4,199,185 | A | * | 4/1980  | Woolcock | 296/180.2 |
| 4,245,862 | A |   | 1/1981  | Buckley, Jr. |     |
| 4,290,639 | A |   | 9/1981  | Herpel |           |
| 4,316,630 | A | * | 2/1982  | Evans | 296/180.2  |
| 4,360,232 | A |   | 11/1982 | Elder |            |
| 4,607,874 | A | * | 8/1986  | Peairs | 296/180.3 |
| 4,749,220 | A | * | 6/1988  | Adams et al. | 296/180.3 |
| 4,775,179 | A | * | 10/1988 | Riggs | 296/180.2 |
| 4,779,915 | A | * | 10/1988 | Straight | 296/180.3 |
| 4,784,424 | A | * | 11/1988 | Wiley, Jr. | 296/180.2 |
| 4,904,015 | A | * | 2/1990  | Haines | 296/180.3 |
| 5,317,880 | A | * | 6/1994  | Spears | 62/239   |
| 5,538,316 | A | * | 7/1996  | Bartholomew | 296/180.5 |
| 6,183,041 | B1 | * | 2/2001 | Wilson | 296/180.1 |
| 6,428,084 | B1 | * | 8/2002 | Liss | 296/180.3 |

* cited by examiner

*Primary Examiner*—Patricia L. Engle
*Assistant Examiner*—Greg Blankenship
(74) *Attorney, Agent, or Firm*—Potomac Patent Group PLLC

(57) ABSTRACT

An adjustable roof extension for a vehicle that has a cab portion and a trailer portion includes a roof extension adapted for disposition at a rear of a roof of the cab portion and an adjustment mechanism that attaches the roof extension to the cab portion such that the roof extension is pivotable and that an end of the roof extension that is nearer the trailer portion is controllably movable to pull an air flow over the cab portion toward the trailer portion.

21 Claims, 4 Drawing Sheets

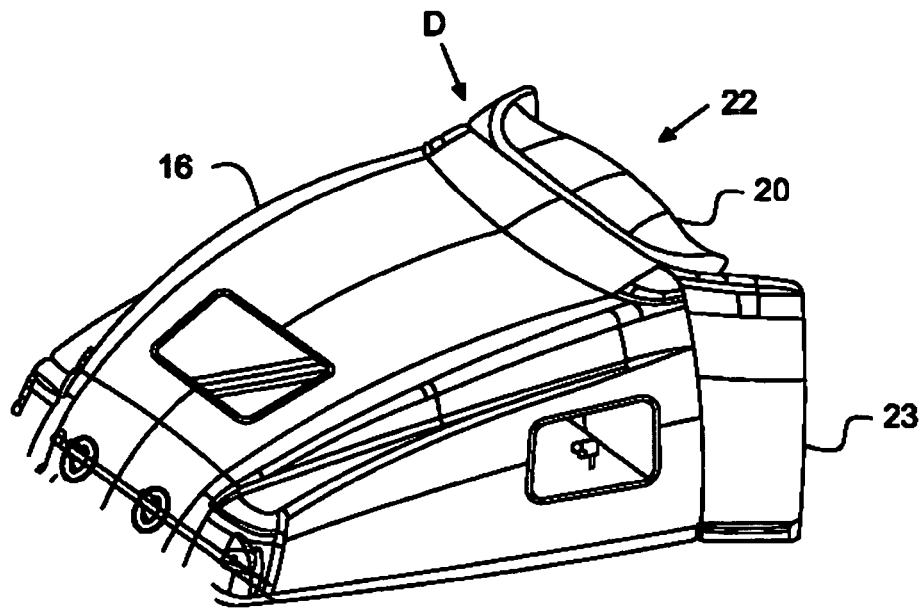
FIG. 3
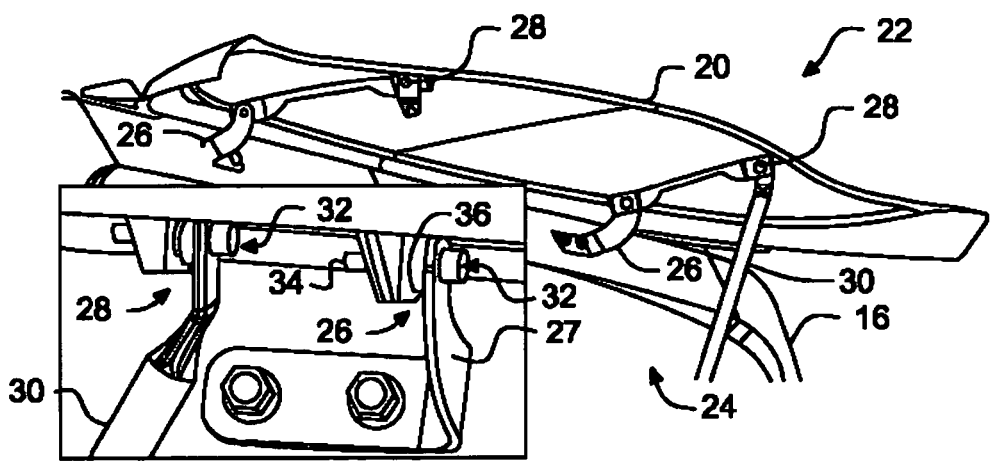
FIG. 4A
FIG. 4

ADJUSTABLE ROOF EXTENSION FOR REDUCING VEHICLE WIND RESISTANCE

BACKGROUND

This application relates to devices that improve the aerodynamic performance of vehicles and more particularly to air flow control surfaces on trucks.

Over-the-highway trucks and tractor-trailer combinations come in many different sizes and configurations, and the aerodynamic properties of those configurations can have a significant effect on the operational efficiency of the vehicles. Accordingly, fairings and other devices for improving the aerodynamic performance of load-carrying vehicles have been developed.

For example, U.S. Pat. No. 4,245,862 to Buckley, Jr., describes a drag-reducing device mounted on the roof of the cab of a vehicle that includes a trailing body for reducing aerodynamic drag. The patent states that a substantial part of the aerodynamic drag experienced by a tractor-trailer combination moving over the highway is the result of air flow separations that occur at the forward edges of the trailer. In one embodiment, a trim tab is hinged along a fairing's back edge, which is horizontal, and is inclined upward at an angle into the air flow above the fairing, deflecting the air flow upward.

U.S. Pat. No. 4,290,639 to Herpel describes a wind deflector having a movable fairing that is mounted on the tractor cab of a tractor-trailer combination to allow for the reduction of wind resistance during movement of the vehicle. The deflector fairing pivots between operative positions, in which air is directed to reduce wind resistance, and a rest position, in which the fairing has no substantial effect on wind resistance.

U.S. Pat. No. 4,006,931 to Groves describes a device for reducing the wind resistance of a vehicle. A false roof of generally inverted-U shape is positioned on top of the roof of the vehicle's cab to form an air-flow channel, and an adjustable vane is positioned at the rear of the channel to direct air flowing through the channel upwardly and over the roof of the trailer. The inclination of the vane is adjustable to accommodate trailers having different heights.

These patents describe devices that are placed in the air flow around a vehicle and operate as air dams, pushing the flow into new directions.

As noted above, the relative geometry of the tractor and trailer in a load-carrying vehicle such as a class-8 tractor-trailer combination can vary widely, and these variations can affect the relative height and length of the gap between the tractor and the trailer and thus the aerodynamic performance of the combination vehicle.

The roof of the cab of a tractor or truck can sit at various heights above the ground, depending on tire diameter, suspension geometry, chassis height, and type of cab, among other factors. Trailers are also commercially available with various container heights, suspensions, and tire choices. In addition, "fifth wheels", which couple tractors to trailers, have various heights above the ground and also affect the relative heights of the cab and trailer and the aerodynamic relationship between them.

Another variable factor in trucks is the length of the gap between the back of a cab and the front of a trailer. The gap varies based on vehicle loading, driver preferences for ride, the position of the fifth wheel with respect to the cab, and the length of the trailer overhanging in front of the fifth wheel, among other factors. Some of these factors can be complicated because some tractors have sliding fifth wheels, which can be used to manage vehicle weight distributions by moving the trailer closer to or farther from the tractor, thereby changing the gap length.

Varying relative heights and gap lengths between cabs and trailers produce varying aerodynamic performance. The shape of the exterior surfaces of a truck is usually optimized for aerodynamic performance despite these variations, but the best performance may be obtained only for a specific combination of relative height and gap length, based on expected high volume market demands for a specific vehicle configuration, for example, a specific relative height and a short gap. As a combination diverges from the optimum height and gap combination, the aerodynamic performance also diverges from the peak performance.

SUMMARY

This application describes an adjustable extension mounted at the rear of the roof of a vehicle such as an over-the-highway tractor that pulls air flow down to the top of the leading edge of a trailer rather than simply pushing the flow into a new direction. The roof extension can be adjusted by the operator from the rear deck plate of the cab. The aerodynamic design of the roof extension guides and facilitates air flow reconnection to an intended surface.

In one aspect of the invention, an adjustable extension for a vehicle that has a cab portion and a trailer portion includes a roof extension adapted for disposition at a rear of a roof of the cab portion and an adjustment mechanism that attaches the roof extension to the cab portion at at least one attachment point such that the roof extension is pivotable and that an end of the roof extension that is nearer the trailer portion is controllably movable to pull an air flow over the cab portion down to the trailer portion.

In another aspect of the invention, a cab for attachment to a trailer so as to form a vehicle includes a roof, an extension adapted for disposition at a rear of the roof, and an adjustment mechanism that attaches the extension to the cab at at least one attachment point such that the extension is pivotable and that an end of the extension nearer the trailer is controllably movable to pull an air flow over the cab down toward the trailer. An angle at which the extension is disposed with respect to, for example, a horizontal reference plane is less than an angle with respect to the reference plane at which the air flow detaches from the cab.

BRIEF DESCRIPTION OF THE DRAWINGS

The various features, objects, and advantages of the invention will be apparent from a reading of this description in conjunction with the drawings, in which like elements are identified by like reference characters and in which:

FIG. 3 is a perspective view of an adjustable roof extension mounted at the rear of the roof of a cab;

FIGS. 4, 4A depict portions of a mechanism that pivotally attaches a roof extension to a cab;

DETAILED DESCRIPTION

Applicants provide methods and systems for optimizing aerodynamic performance for gap lengths different from those for which a tractor has been optimized. In addition, effects of varying relative heights are compensated.

Applicants have found that the aerodynamics of a truck can be optimized over a wider range of cab/trailer gaps than usual, resulting in gains of 1% to 2% in fuel economy for vehicle configurations where the gap is longer and the relative height divergent from conditions that are optimum for the exterior geometry of the vehicle.

Figure 1:
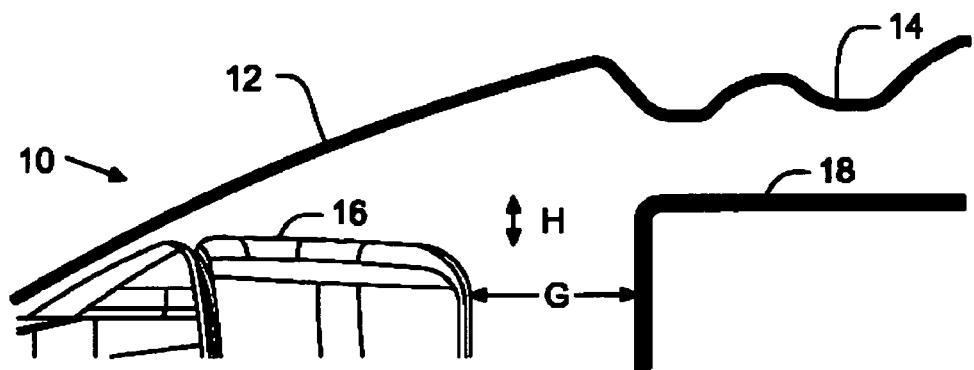
FIG. 1 depicts a schematic air flow over the tops of a truck cab and a trailer that have non-optimal cab-trailer gap and relative height.

If the air flow off a cab's roof is not directed optimally toward the trailer, the flow will not reconnect efficiently to the trailer but will tumble and flow turbulently over the trailer, increasing aerodynamic drag and reducing fuel mileage and efficiency. This is schematically depicted in FIG. 1, which shows an air flow 10 having a smooth portion 12 and a turbulent portion 14. The smooth portion 12 of the flow 10 is over the top of a cab 16, and it can be seen that the turbulent portion 14 is over the top of a trailer 18. In FIG. 1, the difference between the heights of the cab 16 and the trailer 18 is indicated by the two-headed arrow H and the gap between the back of the cab 16 and the front of the trailer 18 is indicated by the two-headed arrow G. It will be understood that a tractor-trailer combination is designed for a particular gap G, which is usually the minimum to avoid the possibility of interference between the tractor and trailer during operation. An exemplary minimum gap is about 0.8 meter (m). Accordingly, this application is written in terms of gap lengths that may be longer than optimum, but not shorter. An exemplary longer gap is 1.27 m. Nevertheless, it will be appreciated that this is done for convenience only and is not a requirement.

Figure 2:
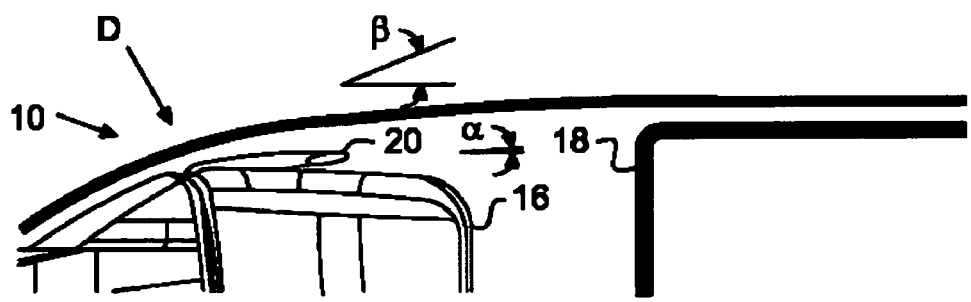
FIG. 2 depicts an improved air flow over the tops of a truck cab having a roof extension and a trailer.

As depicted in FIG. 2, attaching a roof extension 20 at the rear of the cab's roof can keep the air flow 10 over the cab 16 in contact with the cab's roof and the roof extension 20, which directs the flow toward a more optimal position with respect to the forward edge of the trailer 18. The roof extension 20 maintains a more laminar flow by pulling the air flow 10 down toward the top of the trailer 18. It will be appreciated that the roof extension 20 does not push the air flow up and over the trailer to any substantial extent, unlike the trim tabs disclosed in the above-cited patents.

This can be understood by considering the angle $\alpha$ of Applicants' roof extension 20 and the angle $\beta$ of the air flow at the point D where it detaches from the roof of the cab 16. With respect to a convenient reference such as a horizontal plane, it will be seen that Applicants' angle $\alpha$ is smaller than angle $\beta$. If Applicants' angle $\alpha$ were larger than angle $\beta$, the roof extension 20 would extend into the air flow 10 and deflect it in the manner of the above-cited patents. In contrast, the angle of Applicants' roof extension is such that it does not extend into the air flow and yet still pulls the air flow down toward the top of the trailer 18. It is currently believed that Applicants' roof extension exploits the Bernoulli and Coanda effects. Optimal values of angle $\alpha$ that correspond to optimal (minimal) values of aerodynamic drag coefficient can be readily determined for particular dimensions of tractor-trailer combinations and roof extensions by wind-tunnel testing, either actual or simulated.

The roof extension 20 is preferably about as wide as the trailer 18, within any regulations that may limit cab width, so that the optimal amount of air is directed from the cab roof to the optimal point on the trailer. The roof extension's length is preferably such that it extends rearward from the cab as far as possible without contacting the tractor's exhaust stacks or the trailer swing envelope. The extension's rear edge may be shaped as appropriate to clear all expected exhaust stack movements, and the trailer swing envelope can be determined relative to the cab by trailer swing and pivot angle from fifth wheel movement.

The roof extension 20 is preferably formed of a rigid material so that vibration is minimized, since vibrations at the natural frequencies of the extension would reduce the extension's fuel efficiency improvement. The roof extension can have various shapes, and at least the upper surface of the extension should be smooth enough to reduce air flow resistance over the extension. The roof extension 20 may advantageously be a lightweight reinforced thermoplastic that keeps the mass of the cab to a minimum, although it will be appreciated that many other materials would be suitable.

Due to the wide variety of possible combinations of cab-trailer relative heights H and gaps G, a fixed roof extension does not yield optimal benefits for many tractor-trailer combinations. Making the roof extension 20 adjustable enables the more nearly optimum aerodynamic performance depicted in FIG. 2 to be obtained from more combinations. Accordingly, an adjustable roof extension is provided that advantageously pivots at at least one point such that the end of the extension that is nearer the trailer moves up or down in a direction more or less parallel to the two-headed arrow H depicted in FIG. 1.

FIG. 3 is a perspective view of one embodiment of Applicants' adjustable roof extension 22 mounted at the rear of the roof of the cab 16 of a class-8 tractor. The figure depicts a tractor having a sleeper compartment and roof side fairings 23, (only one fairing can be seen in FIG. 3), but it will be appreciated that the adjustable roof extension 22 can be provided on other kinds of tractors, trucks, and load-carrying vehicles. Moreover, the point D at which an air flow over the top of the cab 16 would detach is also indicated, and it will be appreciated that the top or roof of the cab is the uppermost portion over which air flows. As described below, the extension 22 is mounted such that it can easily pivot and thereby accommodate different combinations of cab-trailer relative heights and gaps.

FIG. 4 depicts a portion of an adjustment mechanism 24 that attaches the roof extension 22 to the cab 16 and still enables the extension to pivot at all attachment points. In one embodiment, the extension 20 is attached to the roof of the cab 16 at one or more front pivoting mounting points 26. The mechanism 24 further includes one or more rear pivoting mounting points 28 that pivotally attach the extension 20 to an end or ends of an adjustment rod 30.

FIG. 4A is a detailed view of a front mounting point 26 and a rear mounting point 28. The front mounting point 26 includes a bracket 27 fixedly attached at one end to the cab 16 and pivotally attached at the other end to the extension 20 by a pin 32 that advantageously provides low-friction rotation that facilitates adjustment of the extension 22. As depicted in FIG. 4A, the pin 32 includes a rivet, screw, or bolt 34 passed through a bushing 36, which may be a low-friction material, such as nylon or TEFLON plastic. As in the front pivoting mounting point 26, the rear mounting point 28 includes another pin 32, which pivotally attaches the extension 20 to an end of the adjustment rod 30. This arrangement is advantageous in that it is relatively easy to make.

It will be understood by those of skill in the art that the extension 20 can be attached to a cab's roof by many kinds of hinge pin mechanisms. For example, a door hinge, piano hinge, or any hinge mechanism in which one side of the hinge body rotates on a single axis relative to the other side of the hinge body can be used at the front mounting point. The hinge mechanism can be made of any material suitable for the exterior environment and operating conditions of the cab. As depicted in the figures, the body of the roof extension is molded so as to act as the second mounting point for the hinge rotation. The rear hinge point of the roof extension can use the same type of hinge mechanism as the front, provided that the rear hinge point connects the body of the roof extender to the adjustment rod at a single hinge point.

Figures 5, 5A:
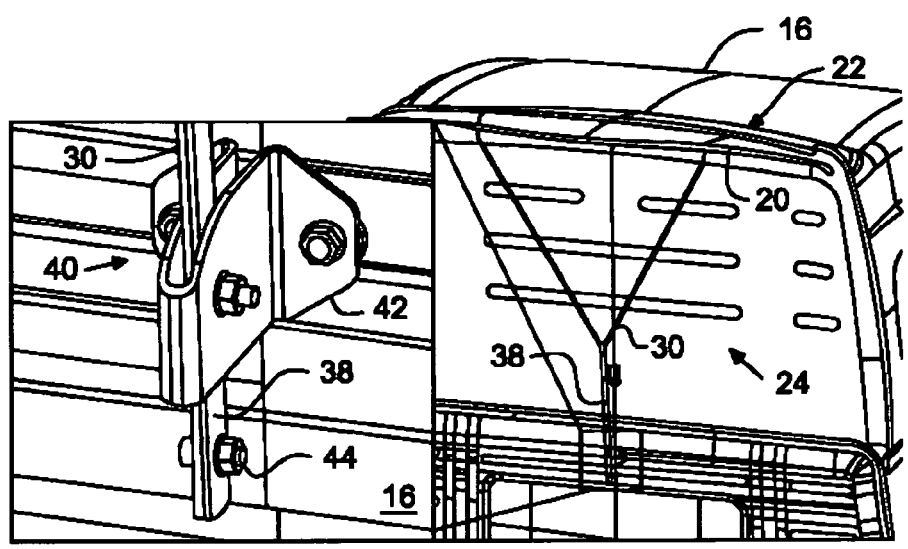
FIGS. 5, 5A depict portions of the mechanism of FIGS. 4, 4A that pivotally attaches a roof extension to a cab.

FIG. 5 is another view of the adjustment mechanism 24 seen in FIGS. 4, 4A that shows the adjustment rod 30 as Y-shaped, with an adjustment end 38 (the "trunk" of the "Y") being attached to the cab 16 at an adjustment point 40. The adjustment end 38 of the rod 30 has a plurality of locating holes, one of which is selected for the proper setting of the roof extension 22. It will be appreciated that the Y-shape of the adjustment rod is advantageous in that, among other things, it combines a plurality of points for supporting the extension against forces exerted by the air flow and by shocks and vibrations (the "arms" of the "Y") with the a single point for adjusting the position of the extension (the "trunk" of the "Y").

As seen in more detail in FIG. 5A, the adjustment point 40 includes a U-shaped adjustment bracket 42 that is attached to the cab 16, for example by bolts. The adjustment end 38 of the rod 30 is secured between the arms of the U-shaped bracket 42 by a suitable releasable fastener, such as a screw or bolt, that passes through a selected one of the locating holes in the rod end. As depicted in FIG. 5A, the adjustment end 38 of the rod 30 may include a bolt 44 or similar device or be shaped in a way such that total withdrawal of the adjustment end 38 from the bracket 42 is inhibited. It will be appreciated that instead of the depicted arrangement, the adjustment end 38 may include one hole and the bracket 42 may include a plurality of locating holes. In addition, the bracket could also simply clamp the end of the rod at various settings, indicated by marks along the rod.

The mechanism 24 is advantageous at least in that it facilitates an operator's adjustment of the roof extension 22 from the "cat walk" at the rear of the cab in some classes of tractors. To change position of the extension 22, the operator simply climbs onto the cat walk and sets the adjusting rod by installing a bolt or screw through one of the locating holes in the rod and bracket. The locating holes correspond to respective combinations of the relative heights and cab-trailer gaps. Once the correct hole is determined, the screw or bolt is fastened tight to the adjustment bracket on the cab rear.

The adjustment mechanism 24 must permit pivoting of the extension 20 and provide an adjustable interface at the rear of the cab within easy reach of an operator that allows the operator to move the rear of the roof extension into the optimum or nearly optimum setting for the cab/trailer combination. The depicted mechanism includes two rods joined in a "Y" formation, but it will be understood that the mechanism is not limited to this form. For example, the mechanism could be simply a single rod having several setting holes or an adjustable slide secured by a clamp, or a scissor mechanism. The adjustment mechanism may also include one or more electric motors controlled by an operator, as long as it provides settings related to the measured relative height and gap between the trailer and the cab. Such a motor could drive the "trunk" of the "Y", or one or more motors could be incorporated in the front pivoting mounting points 26, eliminating the rear mounting points and other parts of the adjustment mechanism.

To obtain the optimum aerodynamic benefit for a particular tractor-trailer combination, an operator needs to know or be able to determine at least the height of the top of the trailer and the length of the gap between the cab and trailer. It will be appreciated that the gap length and height difference may be determined from any conveniently measurable dimensions of the cab and trailer. If the roof extension 22 is more or less permanently associated with the tractor, it is not necessary for the operator to determine the height of the tractor because that information can be implicit in a table or graph that explicitly maps relative heights and gaps to the locating holes that set the roof extension. It will be appreciated that a table or graph can also explicitly map the trailer height and the cab-trailer gap and the cab height to extension settings. Such a table of adjustable roof extension settings advantageously would be provided in at least two ways, for example by a decal affixed to the rear of the cab near the lower adjustment point, and by information presented in the operator's manual provided with the truck from the manufacturer.

Figure 6:
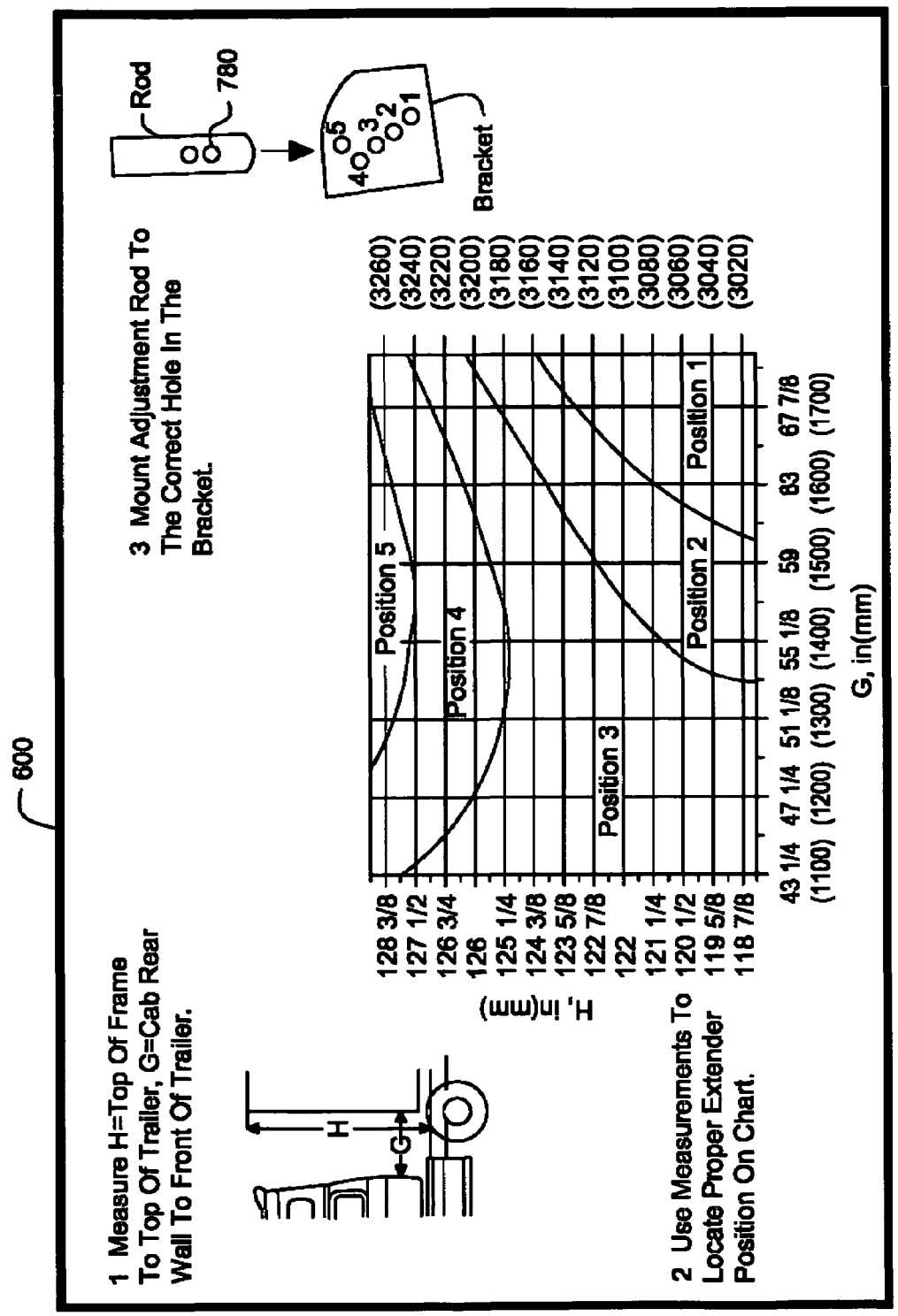
FIG. 6 depicts a decal showing setting information for an adjustable roof extension.

A suitable decal 600 is depicted in FIG. 6 that advantageously sets forth three steps 1-3 for setting an adjustable roof extension for the particular cab and diagrams showing the gap and height to be measured, the rod adjustment end's locating holes, and the adjustment bracket's holes. A graph of gap G versus height H is also included on the decal 600, with convenient units such as inches (in) and millimeters (mm), and the graph includes several curves that indicate the combinations of holes to be used for respective gap-height combinations. It will be noted that the decal indicates that the rod's adjustment end has more than one locating hole and that the height H to be measured for the decal is the difference between the top of the trailer and a reference plane on the tractor, which is likely to be more easily determinable than the difference between the heights of the trailer and cab discussed above.

Applicants' invention may be embodied in many different forms, not all of which are described above, and all such forms are contemplated to be within the scope of the invention.

It is emphasized that the terms "comprises" and "comprising", when used in this application, specify the presence of stated features, steps, or components and do not preclude the presence of one or more additional features, steps, components, or groups thereof.

The particular embodiments described above are merely illustrative and should not be considered restrictive in any way. The scope of Applicants' invention is determined by the following claims, and all variations and equivalents that fall within the range of the claims are intended to be embraced therein.

What is claimed is:

1. An adjustable extension for a vehicle that has a cab portion and a trailer portion, comprising:

a roof extension adapted for disposition at a rear of a roof of the cab portion; and an adjustment mechanism that attaches the roof extension to the cab portion at at least one attachment point such that the roof extension is pivotable and that an end of the roof extension that is nearer the trailer portion is controllably movable to pull an air flow over and detached from the cab portion toward the trailer portion across a gap between the cab portion and the trailer portion.

2. The adjustable extension of claim 1, wherein the adjustment mechanism comprises one or more front pivoting mounting points that attach the roof extension to the roof of the cab.

3. The adjustable extension of claim 2, wherein a front pivoting mounting point comprises a bracket fixedly attached at one end to the cab portion and pivotally attached at another end to the roof extension by a pin that provides low-friction rotation.

4. The adjustable extension of claim 3, wherein the pin comprises a fastener passed through a bushing.

5. The adjustable extension of claim 2, wherein the adjustment mechanism comprises one or more rear pivoting mounting points that pivotaily attach the roof extension to an adjustment rod.

6. The adjustable extension of claim 5, wherein the adjustment rod is V-shaped and has an adjustment end pivotally attached to the cab portion at an adjustment point.

7. The adjustable extension of claim 6, wherein the adjustment end has a plurality of selectable locating holes for adjusting a position of the end of the roof extension, the adjustment point comprises a U-shaped adjustment bracket attached to the cab portion, and the adjustment end is securable between arms of the U-shaped adjustment bracket.

8. The adjustable extension of claim 1, wherein an angle at which the roof extension is disposed with respect to a reference plane is less than an angle with respect to the reference plane at which the air flow detaches from the cab portion.

9. A cab for attachment to a trailer so as to form a vehicle, comprising:
   a roof;
   an extension adapted for disposition at a rear of the roof; and
   an adjustment mechanism that attaches the extension to the cab at at least one attachment point such that the extension is pivotable and that an end of the extension nearer the trailer is controllably movable to pull an air flow over the cab down toward the traile;
   wherein an angle at which the extension is disposed with respect to a reference plane is less than an angle with respect to the reference plane at which the air flow detaches from the cab and is at least an arngle such that the extension pulls the air flow toward the top of the trailer.

10. The cab of claim 9, wherein the adjustment mechanism comprises one or more front pivoting mounting points that attach the extension to the roof.

11. The cab of claim 10, wherein a front pivoting mounting point comprises a bracket fixedly attached at one end to the cab and pivotally attached at another end to the extension by a pin that provides low-friction rotation.

12. The cab of claim 11, wherein the pin comprises a fastener passed through a bushing.

13. The cab of claim 10, wherein the adjustment mechanism comprises one or more rear pivoting mounting points that pivotally attach the extension to an adjustment rod.

14. The cab of claim 13, wherein the adjustment rod is Y-shaped and has an adjustment end pivotally attached to the cab at an adjustment point.

15. The cab of claim 14, wherein the adjustment end has a plurality of selectable locating holes for adjusting a position of the end of the extension, the adjustment point comprises a U-shaped adjustment bracket attached to the cab, and the adjustment end is securable between arms of the U-shaped adjustment bracket.

16. An adjustable extension for a vehicle that has a cab portion and a trailer portion, comprising:
   a roof extension adapted for disposition at a rear of a mat of the cab portion; and
   an adjustment mechanism that attaches the roof extension to the cab portion at at least one attachment point such that the roof extension is pivotable and does not contact the trailer portion and that an end of the roof extension that is nearer the trailer portion is controllably movable to pull an air flow over the cab portion toward the trailer portion across a gap between the cab portion and the trailer portion.

17. The adjustable extension of claim 16, wherein the adjustment mechanism comprises one or more front pivoting mounting points that attach the roof extension to the roof of the cab.

18. The adjustable extension of claim 17, wherein a front pivoting mounting point comprises a bracket fixedly attached at one end to the cab portion and pivotalty attached at another end to the roof extension by a pin that provides low-friction rotation.

19. The adjustable extension of claim 17, wherein the adjustment mechanism comprises one or more rear pivoting mounting points that pivotalty attach the roof extension to an adjustment rod.

20. The adjustable extension of claim 19, wherein the adjustment rod is Y-shaped and has an adjustment end pivotally attached to the cab portion at an adjustment point.

21. The adjustable extension of claim 20, wherein the adjustment end has a plurality of selectable locating holes for adjusting a position of the end of the roof extension, the adjustment point comprises a U-shaped adjustment bracket attached to the cab portion, and the adjustment end is socurable between arms of the U-shaped adjustment bracket.

* * * * *